(12) United States Patent
Sotiroff et al.

(10) Patent No.: US 6,516,983 B2
(45) Date of Patent: Feb. 11, 2003

(54) MOVEABLE CARGO SUPPORT PANEL FOR USE IN A VEHICLE

(75) Inventors: John Andrew Sotiroff, Villa Hills, KY (US); Roch Joseph Tolinski, Howell, MI (US); Charles Berry Hopson, Lebanon, TN (US); George Rene Chene, Sterling Heights, MI (US); Simon Blair Dobson, Folkstone (GB); Enrico Fin, Lake Orion, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/916,120

(22) Filed: Jul. 26, 2001

(65) Prior Publication Data

US 2002/0034430 A1 Mar. 21, 2002

Related U.S. Application Data

(60) Provisional application No. 60/220,712, filed on Jul. 26, 2000.

(51) Int. Cl.[7] .................................................. B60R 7/00
(52) U.S. Cl. .................. 224/281; 224/403; 224/542; 224/554; 224/564
(58) Field of Search ............................... 224/403, 281, 224/497, 500, 501, 542, 550, 551, 552, 553, 554, 564

(56) References Cited

U.S. PATENT DOCUMENTS

| | | | | | |
|---|---|---|---|---|---|
| 1,629,403 | A | * | 5/1927 | Marwahn | 224/498 |
| 2,091,069 | A | * | 8/1937 | Girl | 224/42.32 |
| 2,490,014 | A | * | 12/1949 | Brand | 224/491 |
| 2,772,041 | A | * | 11/1956 | Zeabari | 224/42.32 |
| 3,103,289 | A | * | 9/1963 | Clary | 224/504 |
| 5,762,245 | A | | 6/1998 | Hurst | |
| 5,879,049 | A | * | 3/1999 | Sinelli | 296/16.03 |
| 5,931,527 | A | | 8/1999 | D'Onofrio et al. | |
| 5,938,262 | A | * | 8/1999 | Mills | 296/26.09 |
| 5,967,054 | A | | 10/1999 | Rosenfeld | |
| 5,967,392 | A | | 10/1999 | Niemi et al. | |
| 5,979,725 | A | | 11/1999 | Lehrman | |
| 6,050,202 | A | | 4/2000 | Thompson | |
| 6,062,452 | A | | 5/2000 | Kauskey | |
| 6,095,585 | A | * | 8/2000 | Pilhall | 296/26.1 |
| 6,113,172 | A | | 9/2000 | Chaloult et al | |
| 6,176,535 | B1 | | 1/2001 | Chaloult et al. | |
| 6,241,137 | B1 | | 6/2001 | Corr | |
| 6,253,943 | B1 | | 7/2001 | Spykerman et al. | |

* cited by examiner

Primary Examiner—Stephen K. Cronin
(74) Attorney, Agent, or Firm—Carlson, Gaskey & Olds

(57) ABSTRACT

A cargo supporting device supports cargo within a vehicle compartment in more than one position. The cargo supporting device includes at least one moveable panel having a cargo supporting surface. The moveable panel moves from a first position that is relatively distant from a cargo access point to a second position that is closer to the cargo access point. The moveable panel effectively brings one or more cargo items closer to an individual to make them more readily accessible.

19 Claims, 3 Drawing Sheets

MOVEABLE CARGO SUPPORT PANEL FOR USE IN A VEHICLE

CROSS REFERENCE TO RELATED APPLICATIONS

This application claims priority to U.S. Provisional Application No. 60/220,712, which was filed on Jul. 26, 2000.

BACKGROUND OF THE INVENTION

This invention generally relates to cargo handling in vehicles. More particularly, this invention relates to a system for repositioning cargo that is positioned within a cargo compartment of a vehicle.

Most vehicles include a cargo-carrying portion. Passenger vehicles typically include a trunk that is enclosed at the rear of the vehicle. Pickup trucks typically include a bed, which may be open or covered by an optional cap. Sport utility vehicles and vans typically include a cargo section near the rear of the vehicle.

Under many circumstances, a portion or all of the cargo within a vehicle cargo-carrying portion is out of reach of an individual or in a position that makes it relatively difficult to reach. This is particularly true in a vehicle trunk that extends relatively deeply toward the front of the vehicle. It becomes difficult for an individual standing behind the rear bumper of the car to reach into the trunk or other cargo-carrying portion to reach or position one or more cargo items.

This problem is particularly apparent when a cargo item is relatively heavy or bulky and an individual needs to bend at an awkward position to reach it and retrieve it. The same can be said for placing such cargo within the cargo-carrying portion.

A variety of original equipment manufacturer and aftermarket devices have been proposed for handling cargo within vehicle trunks or other cargo-carrying portions. Most of these are directed toward maintaining cargo in a secured position or otherwise segregating various items. Prior to this invention, however, no one has adequately addressed the problem of placing cargo within the cargo-carrying portion in a position where access to the cargo is awkward or difficult. Similarly, no one has provided an adequate solution to the difficulties associated with retrieving such cargo.

This invention provides an arrangement that makes placing cargo within or retrieving cargo from any position within a cargo-carrying portion easier and more ergonomically appropriate.

SUMMARY OF THE INVENTION

In general terms, this invention is a device for repositioning one or more items within a cargo-carrying portion of a vehicle. A device designed according to this invention is believed to be particularly useful within a vehicle trunk but also has application in the bed of a pickup truck or the rear portion of a van or sport utility vehicle.

In one example, a device designed according to this invention has a first portion that remains stationary in the cargo-carrying portion of the vehicle. A second portion preferably is a panel that is moveable relative to the first portion. The second portion preferably is moveable from a first position where it is aligned with and adjacent to the first portion into a second position where the second portion overlies the first portion. In this manner, the second portion can be brought from a position that is relatively distant from an individual outside of the vehicle to a position where it is relatively close to the individual.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
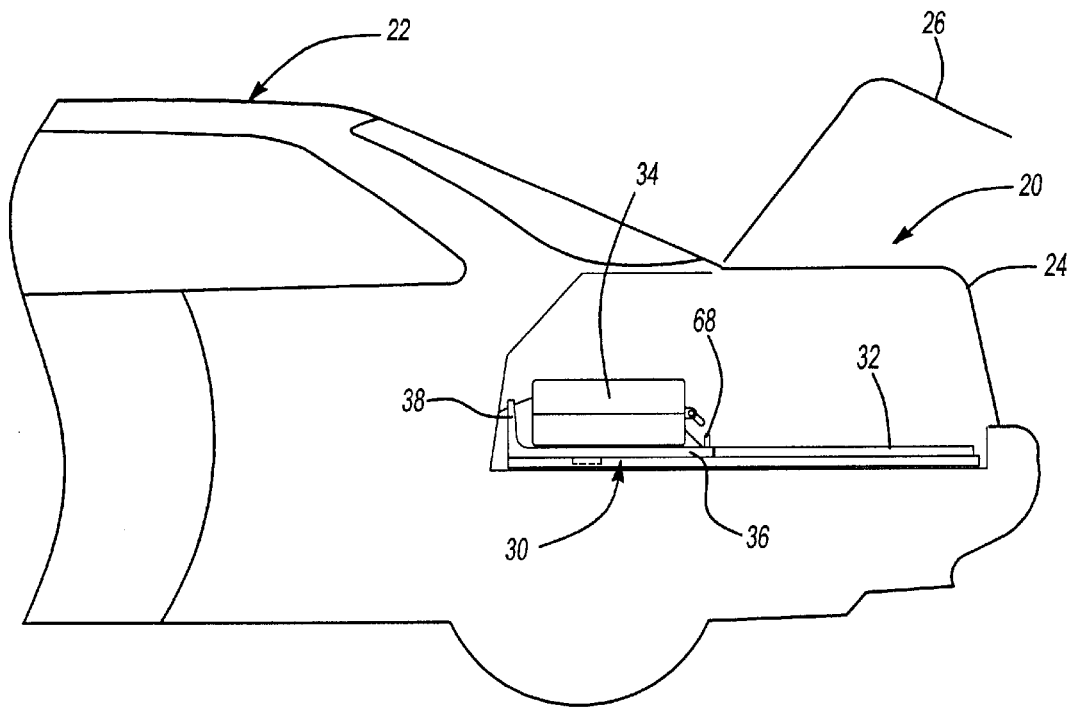
FIG. 1 schematically illustrates a vehicle including a cargo positioning device designed according to this invention in a first position.

A cargo supporting device 20 is useful within a vehicle 22. In the examples of FIGS. 1 through 4, the cargo-carrying device 20 is positioned within a vehicle trunk 24 that is closed using a conventional trunk lid 26.

The cargo supporting device 20 includes a moveable panel portion 30 and a stationary portion 32. In the illustrated example, the stationary portion 32 is a panel that is placed within the trunk of the vehicle. In another example (not illustrated) the stationary portion 32 is integrated into the frame of the vehicle so that it is part of the vehicle trunk 24.

The moveable panel 30 preferably includes a generally planar cargo supporting surface 36 that is capable of supporting one or more cargo items 34. A restraining feature, which is a raised edge 38 in the illustrated example, preferably is provided along at least one edge of the moveable panel 30. The raised edge 38 provides a stop that assists in keeping the item 34 on the panel 30 while the vehicle is in transit or while the panel 30 is moving relative to the portion 32.

The illustrated example includes a motorized moving mechanism 40 for moving the panel 30 relative to the stationary portion 32. A motorized winding mechanism 42 and a set of cables 44 and 46 operate to translate the moveable panel 30 between two positions. The motorized mechanism is shown schematically. Given this description, those skilled in the art will be able to appropriately arrange components to achieve an effective moving mechanism.

Figure 3:
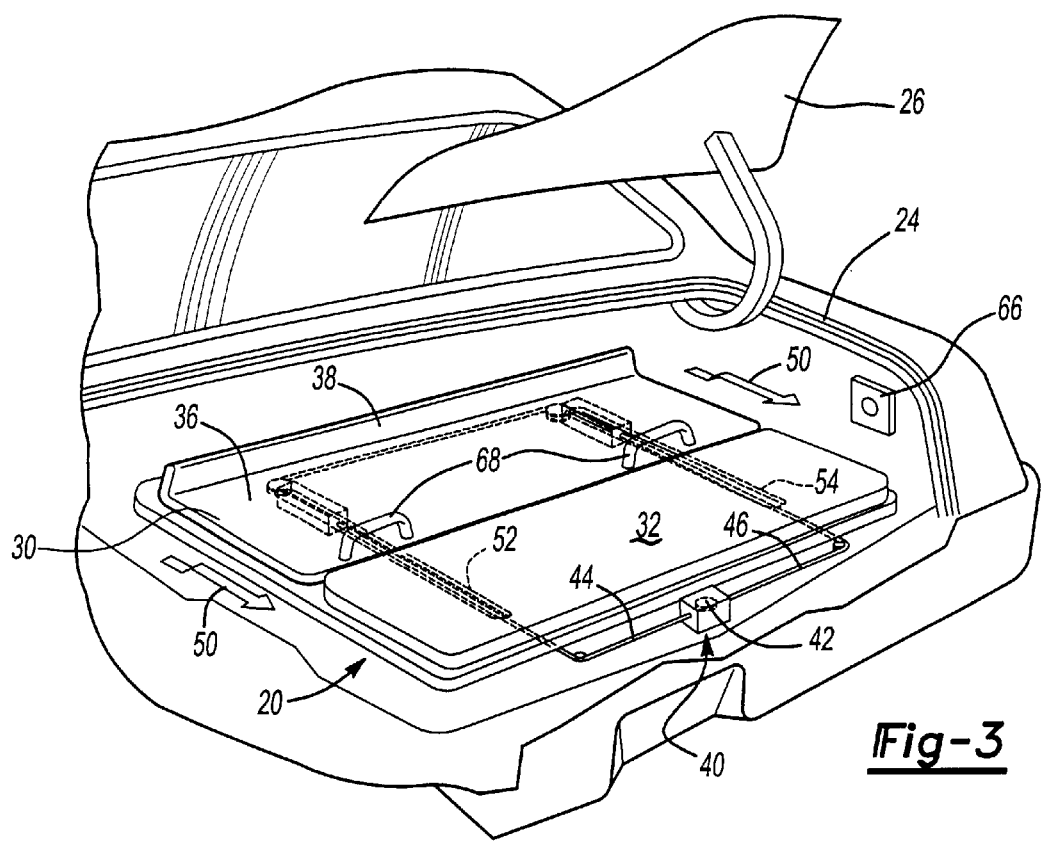
FIG. 3 is a schematic, perspective illustration of the embodiment of FIG. 1 in the same operating position as shown in FIG. 1.

A first operating position is shown in FIGS. 1 and 3 where the moveable panel 30 is aligned with and adjacent to one edge of the stationary portion 32. In this position, the portions 30 and 32 form a generally continuous cargo supporting surface.

Figure 2:
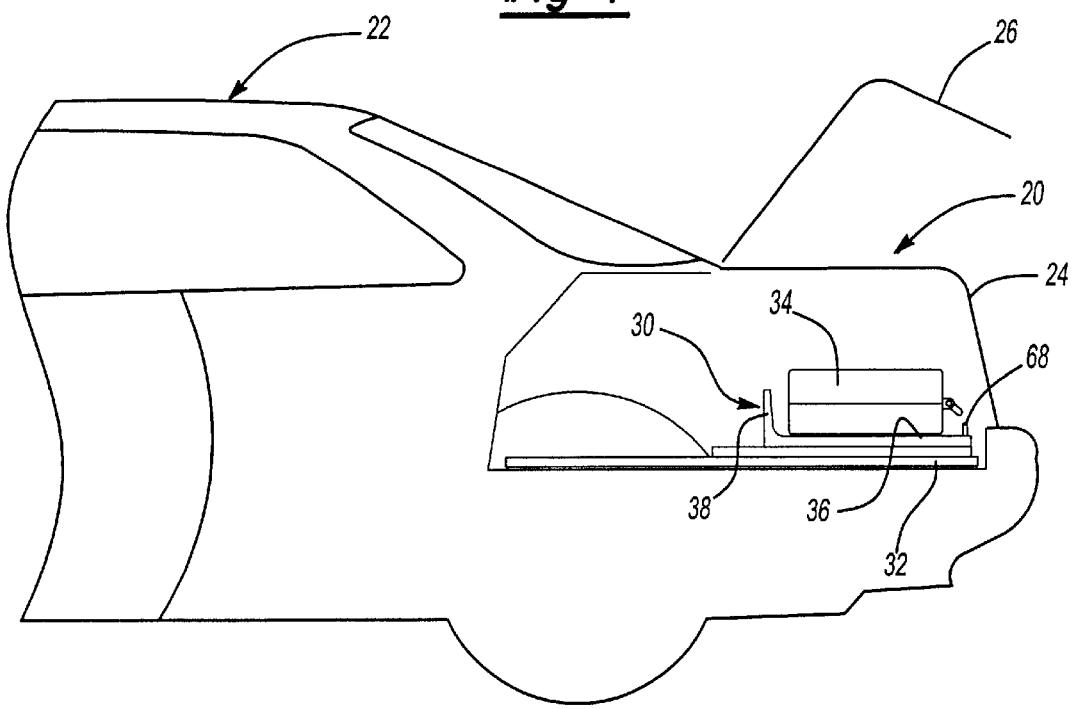
FIG. 2 schematically illustrates the embodiment of FIG. 1 in a second position.
Figure 4:
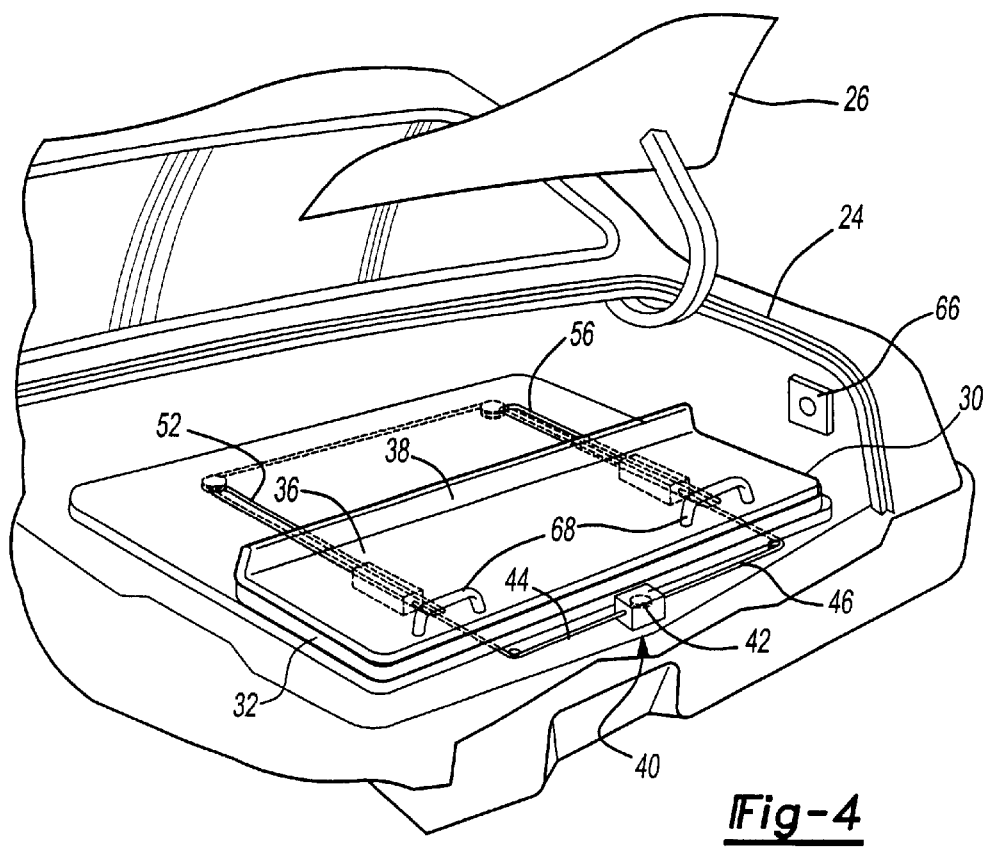
FIG. 4 is a perspective, schematic illustration showing the cargo positioning device in the position also shown in FIG. 2.

As shown in FIGS. 2 and 4, the panel 30 is in a second operating position where the panel 30 is generally parallel with and positioned above the stationary portion 32. As can be appreciated from the drawings, the stationary portion 32 is more proximate to the portion of the opening of the trunk 24 that is typically assessed by an individual when in the second operating position. In other words, the stationary portion 32 preferably is closest to the rear bumper of the vehicle while the moveable panel 30 is repositionable from a position above the stationary portion 32 (i.e., close to the rear bumper of the vehicle) into a position that is more deeply positioned within the recess of the trunk 24.

By moving the panel between the first and second portions, cargo items 34 are more easily placed deep into the trunk 24 or retrieved from the trunk. The panel 30 effectively translates and lifts the cargo item 34 toward an individual positioned behind the vehicle 22.

The preferred arrangement includes a set of tracks that guide the moveable panel 30 in a direction of movement schematically shown by the arrows 50. The stationary portion 32 preferably includes at least two tracks 52 and 54 to assist guiding support elements (not shown in FIGS. 1–4) of the moveable panel 30 between the two operating positions. In the illustrated example, the tracks 52 and 54 include recesses formed in the stationary portion 32 so that the support members of the moveable panel 30 ride at least partially within the recesses and appropriately configured tracks positioned below the support surface of the stationary portion 32. Corresponding tracks 56 and 58 preferably are provided beneath the first location of the moveable panel portion 30 as seen in FIG. 4. The tracks 56 and 58 in one example are attached directly to the vehicle body structure within the trunk 24.

Figure 6:
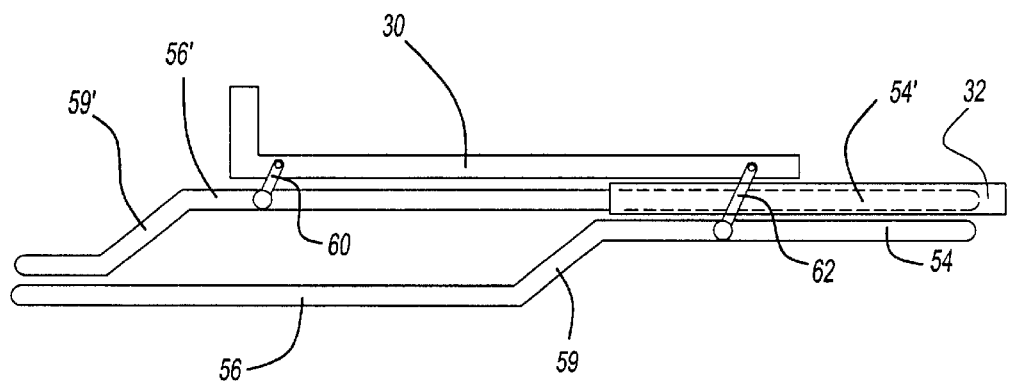
FIG. 6 schematically illustrates a feature of an example device designed according to this invention.

FIG. 6 schematically illustrates a preferred track arrangement. Two example track portions are shown for an embodiment that would include four tracks (two for front support members and two for rear support members of the moveable panel 30). In the example of FIG. 6, the track portions 54 and 56 are joined by a transition portion 59, which assists in guiding the moveable panel 30 from a lowered position (as shown in FIGS. 1 and 3) to a raised position above the stationary portion 32 (shown in FIGS. 2 and 4). Another track having sections 54' and 56' includes a transition portion 59'.

As can be appreciated from the illustration in FIG. 6, the transition portion 59 preferably is positioned forward of the transition portion 59'. The moveable panel 30 preferably includes rearwardly positioned supports 60 and forwardly positioned supports 62. Because the rearward supports 60 effectively trail behind the second set of support 62 as the panel 30 moves from the position shown in FIG. 3 to the position shown in FIG. 4, there is a different location of the transition portions 59 and 59'. The location of each relative to the other preferably is timed to provide stable movement of the panel 32. Having such an arrangement allows for the cargo supporting surface 36 of the moveable panel 30 to remain level or horizontal throughout the travel between the first and second positions of the panel 30. By raising the forward and rearward edges of the panel at the same time (i.e., using the track portions 59 and 59') the cargo is maintained more stably on the panel support surface 36.

As indicated above, the panel 30 preferably is moveable using a motorized mechanism 40. An operator switch 66, which is illustrated on the interior of the trunk 24 for example, preferably allows an individual to operate the motorized mechanism to adjust the position of the panel 30 as desired. The motorized mechanism 40 preferably moves the panel into either of the positions illustrated in FIGS. 3 and 4 or any intermediate position as needed by an individual user.

In the event that the motorized mechanism is not operating or an individual does not desire to utilize it, one or more assisting straps 68 preferably are provided for manually pulling the panel 30 from the position illustrated in FIG. 3 to the position illustrated in FIG. 4.

Figure 5:
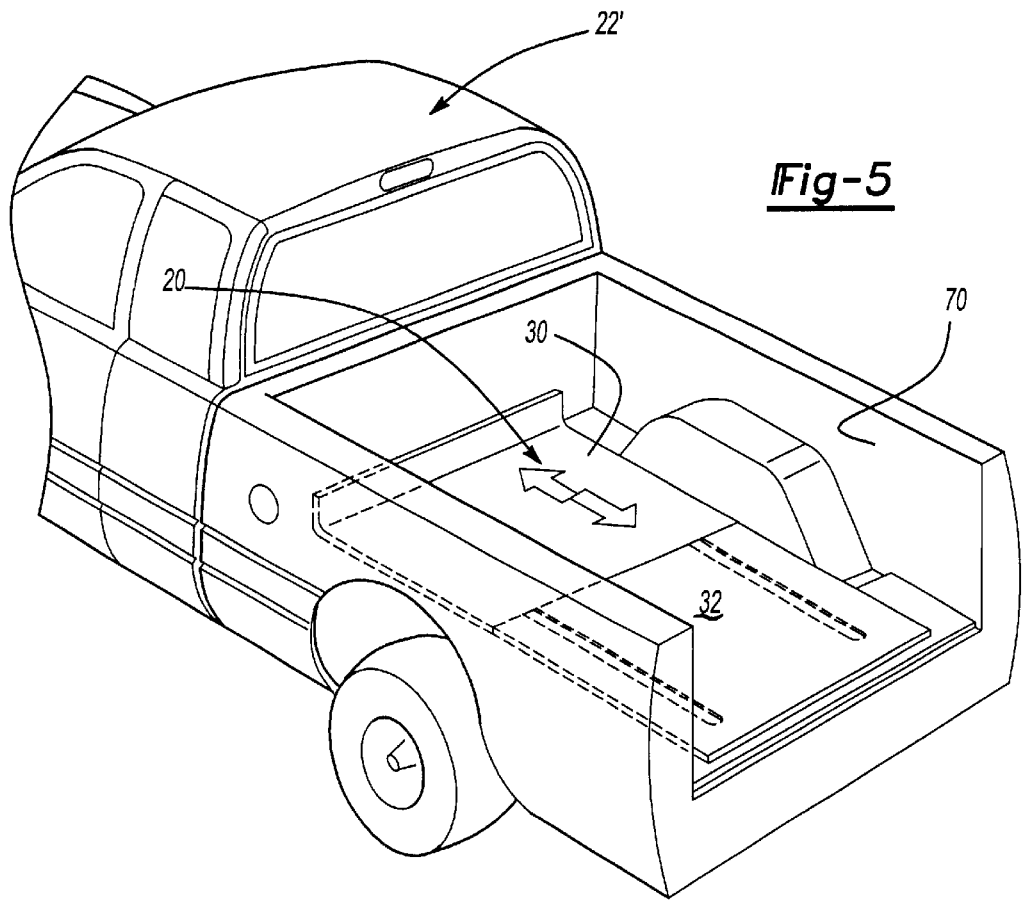
FIG. 5 schematically illustrates, in perspective view another example cargo positioning device designed according to this invention.

While the preceding description focuses on an arrangement where the cargo supporting device 20 is positioned within a trunk of a passenger vehicle, a cargo supporting device designed according to this invention is not so limited. FIG. 5 illustrates an example where the device 20 is within a bed 70 of a pickup truck vehicle 22'. In this instance, the moveable panel 30 is positioned closer to the cab portion of the truck while the stationary portion 32 is within the rear most portion of the bed 70.

Given this description, those skilled in the art will be able to choose from among appropriately sized components to realize tracks and appropriate support members to achieve the positioning and movement of the moveable panel 30 within a vehicle cargo-carrying portion to suit the needs of a particular vehicle.

The preceding description is exemplary rather than limiting in nature. Variations and modifications may become apparent to those skilled in the art that do not necessarily depart from the essence of this invention. The scope of legal protection given to this invention can only be determined by studying the following claims.

We claim:

1. A device for supporting cargo within a compartment of a vehicle, comprising:
   a first portion that remains permanently stationary relative to body of the vehicle, the stationary portion providing a cargo supporting surface; and
   a second portion that is moveable relative to the first portion from a first position where the second portion is aligned with and adjacent to one side of the first portion to a second position where the second portion is above the first portion.

2. The device of claim 1, wherein the second portion comprises a generally planar panel.

3. A device for supporting cargo within a compartment of a vehicle, comprising:
   a first portion that remains stationary relative to body of the vehicle, the stationary portion providing a cargo supporting surface; and
   a second portion that is moveable relative to the first portion from a first position where the second portion is aligned with and adjacent to one side of the first portion to a second position where the second portion is above the first portion wherein the second portion includes a restraining feature associated with an edge of the second portion that is most distal from the first portion when the second portion is in the first position.

4. A device for supporting cargo within a compartment of a vehicle, comprising:
   a first portion that remains stationary relative to body of the vehicle, the stationary portion providing a cargo supporting surface; and
   a second portion that is moveable relative to the first portion from a first position where the second portion is aligned with and adjacent to one side of the first portion to a second position where the second portion is above the first portion wherein the first portion includes a plurality of tracks that guide the second portion between the first and second positions.

5. The device of claim 4, wherein the first portion includes a plurality of recesses within which at least a portion of the tracks are received.

6. The device of claim 4, wherein the tracks include sections that extend beyond the first portion.

7. The device of claim 6, including at least a first track section extending beyond the first portion for guiding a forward support member of the second portion and at least a second track section extending beyond the first portion for guiding a rearward support member of the second portion, the first and second tracks sections including transition portions that are at different distances from the first portion.

8. A device for supporting cargo within a compartment of a vehicle, comprising:

a first portion that remains stationary relative to body of the vehicle, the stationary portion providing a cargo supporting surface; and a second portion that is moveable relative to the first portion from a first position where the second portion is aligned with and adjacent to one side of the first portion to a second position where the second portion is above the first portion wherein the second portion comprises a panel having a raised edge along a side of the panel that is most distal from the first portion and wherein the panel provides a cargo supporting surface that is coplanar with the first portion cargo supporting surface when the panel is in the first position.

9. A device for supporting cargo within a compartment of a vehicle, comprising:

a first portion that remains stationary relative to body of the vehicle, the stationary portion providing a cargo supporting surface; and a second portion that is moveable relative to the first portion from a first position where the second portion is aligned with and adjacent to one side of the first portion to a second position where the second portion is above the first portion including a motorized mechanism for moving the second portion between the first and second positions.

10. A vehicle comprising:

a cargo carrying compartment;

a first portion that remains permanently stationary relative to the cargo carrying compartment, the stationary portion providing a cargo supporting surface; and a second portion that is moveable relative to the first portion from a first position where the second portion is aligned with and adjacent to one side of the first portion to a second position where the second portion overlaps the first portion.

11. The vehicle of claim 10, wherein the cargo carrying compartment comprises a trunk.

12. The vehicle of claim 10, wherein the cargo carrying compartment comprises a truck bed.

13. The vehicle of claim 10, wherein the second portion comprises a generally planar panel.

14. The vehicle of claim 13, wherein the second portion panel has a raised edge along a side of the panel that is most distal from the first portion and wherein the panel provides a cargo supporting surface that is coplanar with the first portion cargo supporting surface when the panel is in the first position.

15. A vehicle comprising:

a cargo carrying compartment;

a first portion that remains stationary relative to the cargo carrying compartment, the stationary portion providing a cargo supporting surface;

a second portion that is moveable relative to the first portion from a first position where the second portion is aligned with and adjacent to one side of the first portion to a second position where the second portion overlaps the first portion; and a plurality of tracks that guide the second portion between the first and second positions.

16. The device of claim 15, wherein the tracks are at least partially supported by the first portion.

17. The device of claim 16, wherein the first portion includes a plurality of recesses within which at least a portion of the tracks are received.

18. A vehicle comprising:

a cargo carrying compartment;

a first portion that remains stationary relative to the cargo carrying compartment, the stationary portion providing a cargo supporting surface;

a second portion that is moveable relative to the first portion from a first position where the second portion is aligned with and adjacent to one side of the first portion to a second position where the second portion overlaps the first portion; and a motorized mechanism for moving the second portion between the first and second positions.

19. A vehicle comprising:

a cargo carrying compartment;

a first portion that remains stationary relative to the cargo carrying compartment, the stationary portion providing a cargo supporting surface; and a second portion that comprises a generally planar panel and that is moveable relative to the first portion from a first position where the second portion is aligned with and adjacent to one side of the first portion to a second position where the second portion overlaps the first portion, the second portion panel has a raised edge along the side of the panel that is most distal from the first portion and wherein the panel provides a cargo supporting surface that is coplanar with the first portion cargo supporting surface when the panel is in the first position.

* * * * *